United States Patent
Wu et al.

(10) Patent No.: US 9,234,641 B2
(45) Date of Patent: Jan. 12, 2016

(54) OPTICAL LENS AND LIGHT SOURCE DEVICE

(71) Applicants: Wen-Chieh Wu, New Taipei (TW); Zhi-Ting Ye, Miaoli County (TW); Ming-Chuan Lin, Taichung (TW); Hsiu-Ping Lee, Taichung (TW)

(72) Inventors: Wen-Chieh Wu, New Taipei (TW); Zhi-Ting Ye, Miaoli County (TW); Ming-Chuan Lin, Taichung (TW); Hsiu-Ping Lee, Taichung (TW)

(73) Assignee: WINTEK CORPORATION, Taichung (TW)

( * ) Notice: Subject to any disclaimer, the term of this patent is extended or adjusted under 35 U.S.C. 154(b) by 81 days.

(21) Appl. No.: 14/264,073

(22) Filed: Apr. 29, 2014

(65) Prior Publication Data

US 2014/0321128 A1    Oct. 30, 2014

(30) Foreign Application Priority Data

Apr. 29, 2013 (TW) .............................. 102207879 U

(51) Int. Cl.

| F21V 13/04 | (2006.01) |
| F21S 8/10 | (2006.01) |
| G02B 19/00 | (2006.01) |
| F21V 5/04 | (2006.01) |
| F21V 7/00 | (2006.01) |
| F21W 131/103 | (2006.01) |
| F21Y 101/02 | (2006.01) |

(52) U.S. Cl.
CPC .............. *F21S 48/24* (2013.01); *F21S 48/215* (2013.01); *F21S 48/236* (2013.01); *G02B 19/0028* (2013.01); *G02B 19/0061* (2013.01); *F21V 5/04* (2013.01); *F21V 7/0091* (2013.01); *F21W 2131/103* (2013.01); *F21Y 2101/02* (2013.01)

(58) Field of Classification Search
CPC ....... F21S 48/24; F21S 48/215; F21S 48/236; F21V 5/04; F21V 7/0091; F21W 2131/103; F21Y 2101/02; G02B 19/0028; G02B 19/0061
See application file for complete search history.

(56) References Cited

U.S. PATENT DOCUMENTS

| 7,524,098 B2 | 4/2009 | Vennetier et al. | |
| 8,118,457 B2 * | 2/2012 | Kanai | F21V 5/04 362/327 |
| 8,167,455 B2 | 5/2012 | Hsu | |

FOREIGN PATENT DOCUMENTS

| CN | 102282416 | 12/2011 |
| JP | 4384133 | 12/2009 |
| JP | 2011228226 | 11/2011 |
| JP | 5050149 | 10/2012 |
| TW | M381732 | 6/2010 |
| TW | M415245 | 11/2011 |
| TW | M433522 | 7/2012 |

* cited by examiner

*Primary Examiner* — Stephen F Husar
(74) *Attorney, Agent, or Firm* — Ming Chow; Sinorica, LLC

(57) ABSTRACT

An optical lens including a first light exit surface, a total internal reflection (TIR) surface, a second light exit surface and a third light exit surface connected in an order, and correspondingly has a first intersection, a second intersection and a third intersection therebetween. A first line between the first intersection and a reference point on an optical axis of the optical lens intersects with the optical axis to form a first angle between 30 degrees to 60 degrees, and a first direction of the reference point pointing toward a point on the TIR surface intersects with a normal of the first light exit surface at the point to form a reflecting angle larger than a critical angle of TIR. A second line between the second intersection and the reference point intersects with the first line to form a second angle between 10 degrees to 30 degrees.

21 Claims, 5 Drawing Sheets

OPTICAL LENS AND LIGHT SOURCE DEVICE

CROSS-REFERENCE TO RELATED APPLICATION

This application claims the priority benefit of Taiwan application serial no. 102207879, filed on Apr. 29, 2013. The entirety of the above-mentioned patent application is hereby incorporated by reference herein and made a part of this specification.

BACKGROUND

1. Field of the Disclosure

The disclosure relates to an optical component and a light source device, and particularly to an optical lens and a light source device using the optical lens.

2. Description of Related Art

In the recent years, along with the progression of semiconductor technology, light emitting diode (LED) is able to emit light beam having high luminous intensity, and the luminous efficiency of the LED is constantly improved. Compared to some conventional light sources, the LED light source has the advantages of energy efficient, small size and long life expectancy. Therefore, the conventional light sources are gradually replaced with the LED light source, and the LED light source is widely applied in the field of lighting, such as car headlights, street lamps, desk lamps, etc.

The LED light sources used for illumination generally has an angle of half maximum power that is approximately 120 degrees, and the luminous intensity of the LED at the forward direction substantially perpendicular to the light-emitting surface is higher while that at the oblique direction oblique to the forward direction is weaker. In other words, the light emitted by the LED has a Lambertian distribution. Therefore, if the LED light source is directly applied in a conventional light bulb without any modification, the light emission angle of the light bulb having the LED light source would be restricted, and particularly, the light intensity at a side opposite to the light-emitting side of the light source is even weaker. In order to increase the light emission angle of the lamp, some LED light bulbs are accessorized with a lampshade having the scattering effect. By such lampshade, the light intensity in the direction backward to the light-emitting side of the LED light bulb may be increased; however, it is still not enough to meet the requirement of the omnidirectional lighting, such as the Energy Star omnidirectional specification. That is, the Energy Star specifics that luminous intensity (cd) at any angle in the 0° to 135° zone shall not differ from the mean intensity for the entire 0° to 135° zone by more than 20%.

SUMMARY OF THE DISCLOSURE

The disclosure provides an optical lens, which re-distributes a light beam and is applied to a light source device.

The disclosure provides a light source device, which provides a light emission angle having wider range as well as good light output effect.

According to the disclosure, an optical lens includes a first light exit surface, a total internal reflection (TIR) surface, a second light exit surface, a third light exit surface and a light-incident surface. The light-incident surface is located opposite to the first light exit surface. The optical lens has an optical axis passing through the first light exit surface and the light-incident surface. The TIR surface is connected to the first light exit surface at a first intersection between the first light exit surface and the TIR surface. A first line passing through the first intersection and a reference point defined on the optical axis intersects with the optical axis to form a first angle between 30 degrees to 60 degrees. Furthermore, a first direction of the reference point pointing toward a point on the TIR surface intersects with a normal of the TIR surface at the point to form a reflecting angle larger than a critical angle of total internal reflection. The second light exit surface is located opposite to the TIR surface, and connected to the TIR surface at a second intersection between the second light exit surface and the TIR surface. A second line passing through the second intersection and the reference point intersects with the first line to form a second angle between 10 degrees to 30 degrees. The third light exit surface is connected to the second light exit surface at a third intersection between the third light exit surface and the second light exit surface. The second light exit surface and the third light exit surface are located between the optical axis and a plane through the second intersection parallel to the optical axis.

According to the disclosure, the light source device includes the said optical lens and a light source. The light source has a light emitting surface, and provides a light beam. The reference point is located at the light emitting surface. A part of the light beam entering the optical lens through the light-incident surface is reflected by the TIR surface, and then leaves the optical lens through the second light exit surface of the optical lens.

According to an embodiment of the disclosure, a second direction of the said reference point pointing toward a point on the first light exit surface intersects with a normal of the first light exit surface at the point to form a reflecting angle less than a critical angle of TIR.

According to an embodiment of the disclosure, a third direction of the said reference point pointing toward a point on the third light exit surface intersects with a normal of the third light exit surface at the point to form a reflecting angle less than the critical angle of TIR.

According to an embodiment of the disclosure, the said third intersection is located on the second line, and a distance between the second intersection and the third intersection is within one-third to two-thirds of a length between the second intersection and the reference point.

According to an embodiment of the disclosure, the said optical lens further includes a reference base located on an opposite side of the first light exit surface. The reference base is respectively connected to the light-incident surface and the third light exit surface. A third line passing through the reference point and a fourth intersection of the third light exit surface and the reference base intersects to the second line to form a third angle between 20 degrees and 40 degrees.

According to an embodiment of the disclosure, the said light-incident surface forms a pocket.

According to an embodiment of the disclosure, the said first light exit surface is a flat surface, a curved surface or a contour formed by a plurality of flat surfaces having different slopes.

According to an embodiment of the disclosure, the said TIR surface is a flat surface, a curved surface or a contour formed by a plurality of flat surfaces having different slopes.

According to an embodiment of the disclosure, the said second light exit surface is a flat surface, a curved surface or a contour formed by a plurality of flat surfaces having different slopes.}

According to an embodiment of the disclosure, the said third light exit surface is a flat surface, a curved surface or a contour formed by a plurality of flat surfaces having different slopes.

According to an embodiment of the disclosure, the said optical axis overlaps with a normal of the light emitting surface of the light source.

Accordingly, the optical lens of the disclosure utilizes a plurality of light exit surfaces and the TIR surface to guide the light beam of the light source. A first direction of the reference point defined on the optical axis pointing toward a point on the TIR surface intersects to the normal of the TIR surface at the point to form the reflecting angle larger than the critical angle of TIR. Furthermore, the light beam emitted from the light emitting surface of the light source having the reference point enters the optical lens and then emits outward through the light exit surfaces of the optical lens, in which a part of the light beam undergoing the TIR effect emits toward a direction opposite to the travelling direction of the light beam passing through the first light exit surface. That is, an emitting angle of the part of the light beam can be greater than 180 degrees. Accordingly, the optical lens of the disclosure is adapted to a light source device to distribute the light beams of the light source, so that the light source device is able to provide a wider range of the light emission angle as well as good light output effect.

In order to make the aforementioned and other features and advantages of the disclosure comprehensible, several exemplary embodiments accompanied with figures are described in detail below.

DETAILED DESCRIPTION OF DISCLOSED EMBODIMENTS

Figure 1:
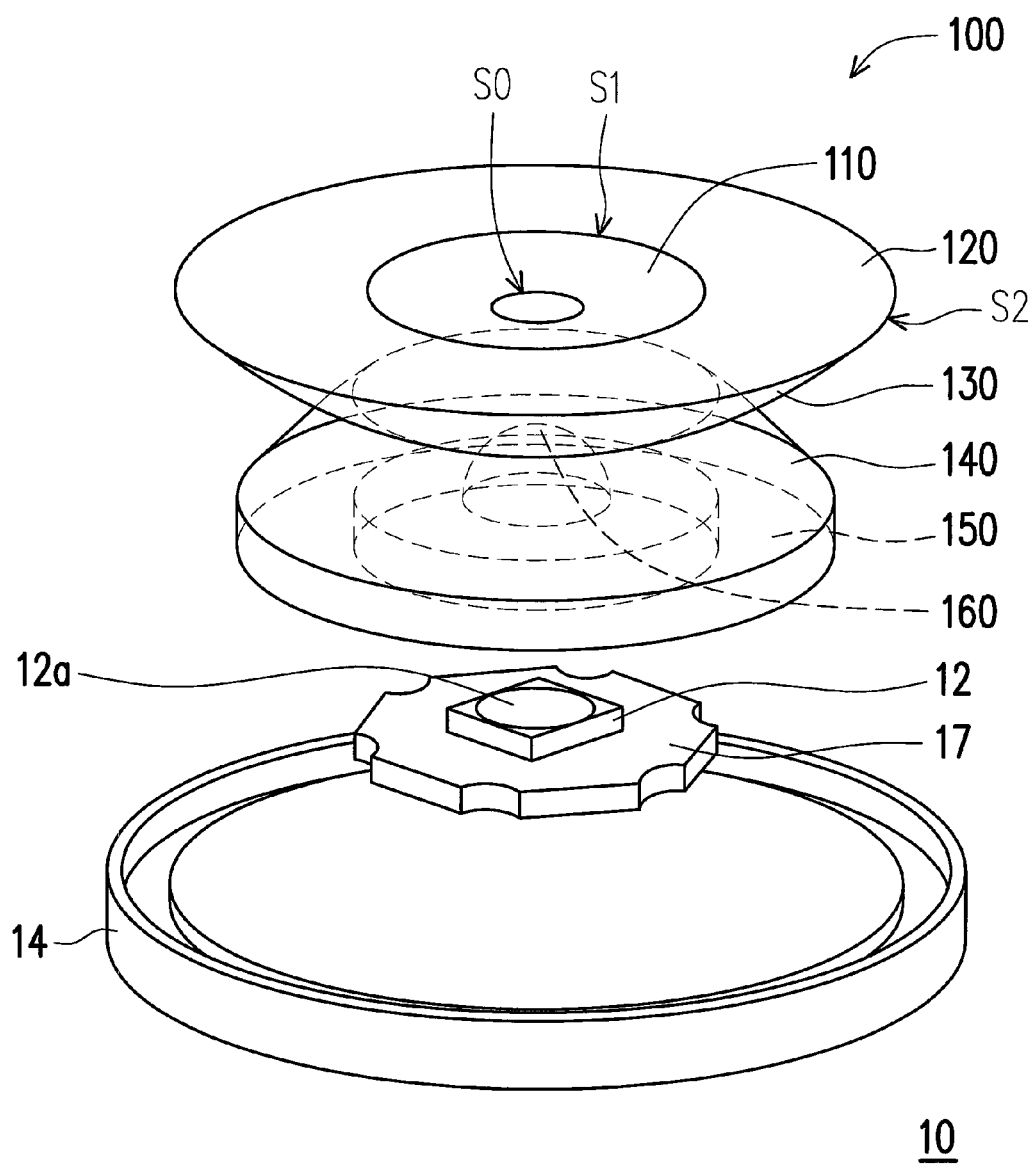
FIG. 1 is exploded schematic illustrating a light source device according to an embodiment of the disclosure.
Figure 2:
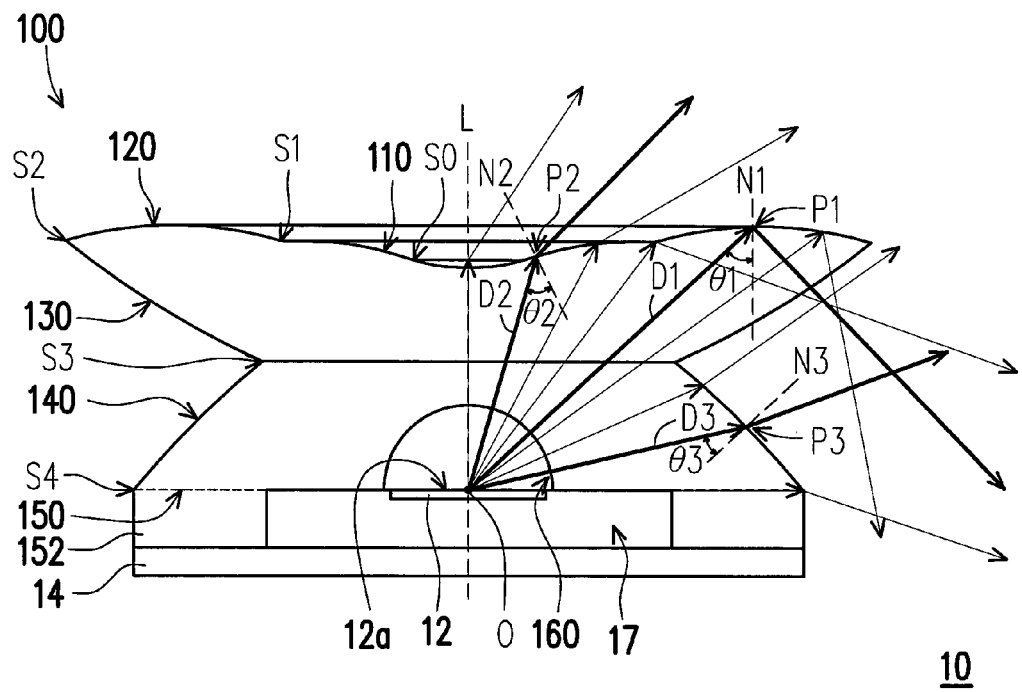
FIG. 2 is diagram illustrating a cross sectional view of the light source device illustrated in FIG. 1.

FIG. 1 is exploded schematic illustrating a light source device according to an embodiment of the disclosure. FIG. 2 is diagram illustrating a cross sectional view of the light source device illustrated in FIG. 1. With reference to FIGS. 1 and 2, in the present embodiment, the light source device 10 includes an optical lens 100 and a light source 12. The light source 12 includes a light emitting surface 12a that may be defined as a flat surface formed by filling a packaging material in a recess of a substrate where a light-emitting diode (LED) chip is disposed in; however it is not limited thereto. In other exemplary embodiments, a substrate of the light source 12 may not include the recess, and the light emitting surface 12a may be spherical or non-spherical. In FIG. 1, the light source 12 is disposed below the optical lens 100 and above a printed circuit board (PCB) 17, and the optical lens 100 and the light source 12 are disposed above a seat 14. Therefore, the light source 10 can be a standalone lamp. However, in other exemplary embodiment, the light source 10 may omit the use of the seat 14, and the optical lens 100 and the light source 12 may be disposed on a stationary location. For instances, the optical lens 100 and the light source 12 may be disposed on a wall or a circuit board, which are configured to form a stationary lamp. In other words, the present disclosure is not limited to the type of the light source device 10.

Figure 3:
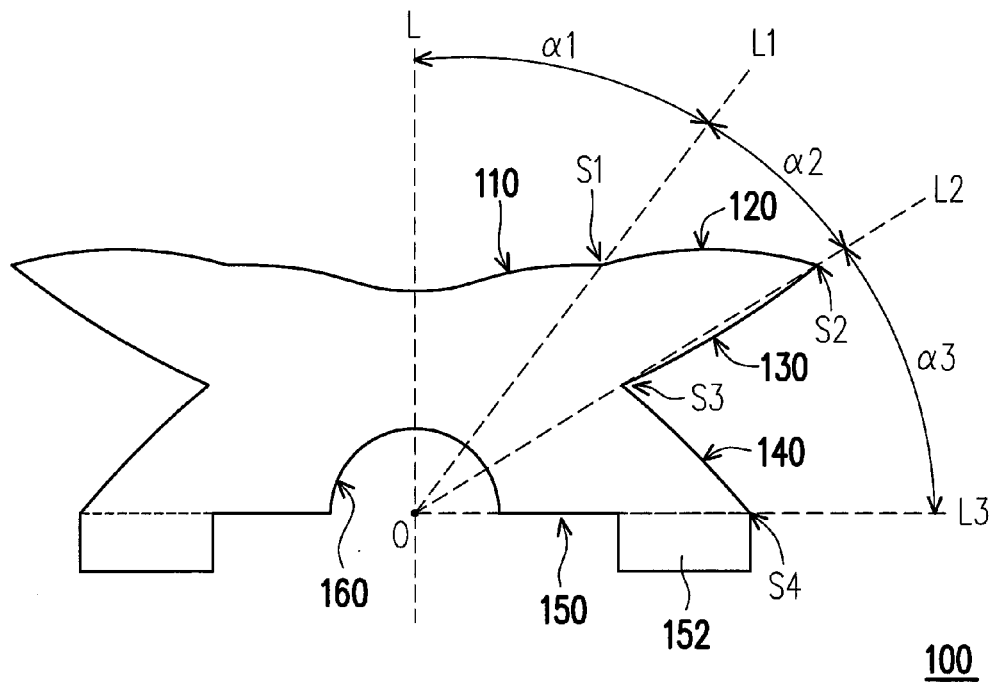
FIG. 3 is a diagram illustrating a cross sectional view of the optical lens illustrated in FIG. 2.

FIG. 3 is a diagram illustrating a cross sectional view of the optical lens illustrated in FIG. 2. With reference to FIG. 1 thru FIG. 3, in the present embodiment, the optical lens 100 includes a first light exit surface 110, a total internal reflection (TIR) surface 120, a second light exit surface 130, a third light exit surface 140, a reference base 150 and a light-incident surface 160. The light-incident surface 160 is located on an opposite side of the first light exit surface 110. The optical lens 110 has an optical axis L passing through the first light exit surface 110 and the light-incident surface 160. The TIR surface 120 is connected to the first light exit surface 110 at a first intersection S1 between the first light exit surface 110 and the TIR surface 120. The second light exit surface 130, which is opposite to the TIR surface 120, is connected to the TIR surface 120 at a second intersection S2 between the second light exit surface 130 and the TIR surface 120. The third light exit surface 140 is connected to the second light exit surface 130 at a third intersection S3 between the second light exit surface 130 and the third light exit surface 140. The reference base 150 is connected to the third light exit surface 140 at a fourth intersection S4 between the third light exit surface 140 and the reference base 150. In addition, the light-incident surface 160 is connected to the reference base 150. A gap between the light emitting surface 12a of the light source 12 and the optical lens 100 may be filled with air, and the light emitting surface 12a emits a light beam toward the optical lens 100. However, in an alternative embodiment, the gap between the light emitting surface 12a and the optical lens 100 may be filled by other medium having a refracting index lower than the optical lens 100 thereof. In FIG. 1 thru FIG. 3, the first light exit surface 110 is depicted as a curved surface similar to an m-shape or a wavy shape having a change of slope represented by a transition line S0. Therefore, the first light exit surface 110 depicted in FIG. 1 has the transition line S0 to show the change of slope. However, in an alternative embodiment, the first light exit surface 110 can be a continuous curved surface not having an obvious transition line S0. Furthermore, the reference base 150 refers to a reference plane, which may be a surface of the optical lens 100 or an imaginary plane constructed by a boundary located at a side of the third light exit surface 140 opposite to the third intersection S3. The optical lens 100 further include a protruding section 152 protruded from the edge of the reference base 150 to form a space for accommodating the light source 12. However, the disposition of the protruding section 152 in the present disclosure is not limited thereto. In other words, with the disposition of the protruding section 152, the reference base 150 is not the surface structure of the optical lens 100, but rather an imaginary surface located at the boundary where the third light exit surface 150 is connected to the protruding section 152.

Furthermore, in the present embodiment, the contour of the optical lens 100 is axisymmetrical with respect to the optical axis L, where the optical axis L passes through the first light exit surface 110 and the light-incident surface 160, and a reference point O may be defined on the optical axis L. As illustrated in FIG. 1, starting from the optical axis L, the first light exit surface 110, the TIR surface 120, the second light exit surface 130 and the third light exit surface 140 are arranged and connected in an order. Alternatively, the reference base 150 connected to the third light exit surface 140 may be defined with respect to a side opposite to the first light exit surface 110, and the light-incident surface 160 connected to the reference base 150 may also be disposed.

With reference to FIG. 3, in the present embodiment, while defining the reference point O on the optical axis L, a first line L1 can be defined by connecting the first intersection S1 and the reference point O together. Similarly, a second line L2 can be defined by connecting the second intersection S2 and the reference point O together. The third intersection S3 is also located on or intersected with the second line L2. A third line L3 can be defined by connecting the fourth intersection S4 and the reference point O together. In the present embodiment, the second light exit surface 130 and the third light exit surface 140 are located between a plane parallel to the optical axis L as well as passing through the second intersection S2 and the optical axis L. At least a part of the second light exit surface 130 is located opposite to the TIR surface 120. Therefore, the second light exit surface 130 may be referred as a surface extending inward in the direction toward the optical axis L from the second intersection S2, so that the intersection of the second light exit surface 130 and the third light exit surface 140 (i.e., the third intersection S3) is between the second intersection S2 and the optical axis L.

On the other hand, with reference to FIG. 2, in the present embodiment, as the reference point O is defined on the optical axis L, a first direction D1 of the reference point O pointing toward an arbitrary point on the TIR surface 120, such as a point P1, intersects with a normal N1 of the TIR surface 120 at the point P1 to form a reflecting angle $\theta 1$. Similarly, a second direction D2 of the reference point O pointing toward an arbitrary point on the first light exit surface 110, such as a point P2, intersects with a normal N2 of the first light exit surface 110 at the point P2 to form a reflecting angle $\theta 2$. In addition, a third direction D3 of the reference point O pointing toward an arbitrary point on the third light exit surface 140, such as a point P3, intersects with a normal N3 of the third light exit surface 140 at the point P3 to form a reflecting angle $\theta 3$. In the present embodiment, the reflecting angle $\theta 1$ is greater than a critical angle of TIR (not shown), and the reflecting angle $\theta 2$ and the reflecting angle $\theta 3$ is less than the critical angle of TIR. After the light beam, shown as arrows from the reference point O, enters the optical lens 100, an incident angle is defined as the angle formed between the incidence direction of the light beam and the normal of the incident surface of the optical lens 100 at the incident point. Generally, in a case that the incident angle is greater than the critical angle of TIR, the light beam is totally reflected. On the other hands, when the incident angle is less than the critical angle of TIR, the light beam is deflected or refracted. The value of the critical angle of TIR of the optical lens 100 depends on the material of the optical lens 100. In the present embodiment, the material of the optical lens 100 is a transparent material, such as poly methyl methacrylate (PMMA). In other embodiments, the optical lens 100 may be made of light permeable material such as glass, acrylic or other transparent polymeric material, and diffusing particle can be added according to the requirement.

In the present embodiment, the reference point O is located at the light emitting surface 12a of the light source 12, and the light source 12 emits a light beam toward the optical lens 100. Under a condition of precision assembly, the optical axis L of the optical lens 100 may overlap with a normal of the light emitting surface 12a of the light source 12, and the reference point O may be located at the center of the light emitting surface 12a of the light source 12. The light-incident surface 160 forms a pocket, such as a pocket with spherical surface being axisymmetric with respect to the optical axis L, so as to uniformly distribute the light beam after passing through the light-incident surface 160. When the light beam of the light source 12 incidents into the optical lens 100, the incident angle is formed between the emitting direction of the light beam and a normal of the optical lens 100 at the incident point. The light beam is refracted according to the value of the incident angle at the light-incident surface 160.

In the present embodiment, after the light beam emitted by the light source 12 passes through the light-incident surface 160, the light beam travels toward the first light exit surface 110, the TIR surface 120, the second light exit surface 130 and the third light emitting surface 140 in the optical lens 100. Since a point of the light emitting surface 12a is located at the reference point O, the emitting direction of the light beam can be referred to as a direction pointing toward an arbitrary point on the surface of the optical lens 100 from the reference point O (e.g., arrows illustrated in FIG. 2). Therefore, a part of the light beam travels toward the TIR surface 120 along the first direction D1, and the traveling direction of the part of the light beam in the optical lens 100 forms the reflecting angle $\theta 1$ with the normal N1 of the TIR surface 120 at the point P1. Meanwhile, a part of the light beam travels toward the first light exit surface 110 along the second direction D2, and the traveling direction of the part of the light beam in the optical lens 100 forms the reflecting angle $\theta 2$ with the normal N2 of the first light exit surface 110 at a point P2. At the same time, a part of the light beam travels toward the third surface 140 along a third direction D3, and the traveling direction of the part of the light beam in the optical lens 100 forms the reflecting angle $\theta 3$ with the normal N3 of the third light exit surface 140 at a point P3. Since the reflecting angle $\theta 1$ is greater than the critical angle of TIR, the part of light beam reaching the TIR surface 120 is entirely reflected, and then travels to the second light exit surface 130. At the same time, since the reflecting angle $\theta 2$ and the reflecting angle $\theta 3$ are less than the critical angle of TIR, the parts of the light beam reaching the first light exit surface 110 and the third light emitting surface 140 are respectively deflected by the first light emitting surface 110 and the third light exit surface 140 and respectively passes through the first light exit surface 110 and the third light exit surface 140, so that the parts of the light beam can emit outside of the first light exit surface 110 and the third light exit surface 140.

Accordingly, the light emitted from the light source 12 of the light source device 10 enters the optical lens 100 and then emits outward from the first light exit surface 110, the second light exit surface 130 and the third light exit surface 140. The light beam passing through the first light exit surface 110 may be diverged so as to cover the region outside of the first light exit surface 110 and the TIR surface 120. While the TIR surface 120 reflects a part of the light beam, such that the reflected part of the light beam passes through the second light exit surface 130. Therefore, the light output effect of the side facing a direction opposite to light-emitting direction of the light emitting surface 12a of the light source 12 is enhanced, so as to compensate the luminous intensity in the back of the light emitting surface 12a and provide the light source 12 having a light emission angle exceeding 180 degree. Furthermore, in the present embodiment, the optical axis L is a normal of the light emitting surface 12a of the light source 12. Therefore, when the first light exit surface 110, the TIR surface 120, the second light emitting surface 130 and the third light emitting surface 140 are axisymmetrical with respect to the optical axis L, the light source device 10 can have a symmetrical light output effect.

With reference to FIG. 3, in the present embodiment, the first line L1 passing through the first intersection S1 and the reference point O intersects with the optical axis L to form a first angle α1, in which the first angle α1 is between 30 to 60 degrees. The second line L2 passing through the second intersection S2 and the reference point O intersects with the first line L1 to form a second angle α2, in which the second angle α2 is between 10 to 30 degrees. Accordingly, the optical lens 100 may distribute the light beam from the light source 12 so that the light emission angle exceeds 180 degree. Furthermore, the following features may be utilized selectively, so that the light beam of the light source 12 may be more uniformly distributed. For example, in some exemplary embodiment, the third intersection S3 may be located on or intersected with the second line L2, and a distance between the second intersection S2 and the third intersection S3 may range from one-third to two-thirds of a length of the second line L2 that is the length between the second intersection S2 and the reference point O. In other exemplary embodiment, the third line L3 passing through the fourth intersection S4 and the reference point O intersects with the second line L2 to form a third angle α3, in which the third angle α3 may be between 20 to 40 degrees. On the other hands, in the present embodiment, the first light exit surface 110, the TIR surface 120, the second light exit surface 130 and the third light exit surface 140 are curved surfaces. The curved surfaces include a spherical surface, an aspherical surface or a combination thereof. In the present embodiment, the first light exit surface 110, the TIR surface 120, and the second light exit surface 130 and the third light exit surface 140 are spherical surfaces. However in some designs having more uniform illumination, the first light exit surface 110, the TIR surface 120, the second light exit surface 130 and the third light exit surface 140 may be aspherical surfaces. Through the designs described above, the light source device 10 has desirable light output effect; however, the present disclosure is not limited to a design having curved surfaces for the first light exit surface 110, the TIR surface 120, the second light exit surface 130 and the third light exit surface 140.

Figure 4:
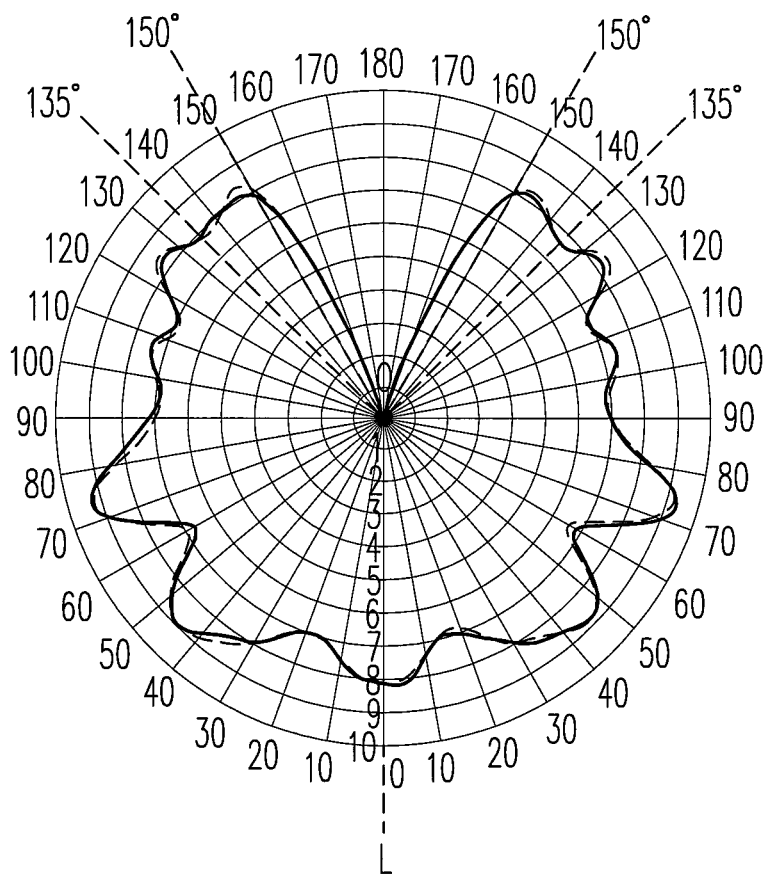
FIGS. 4 and 5 are diagrams illustrating the luminous intensity of the light source device illustrated in FIG. 2 with respect to the light emission angle.
Figure 5:
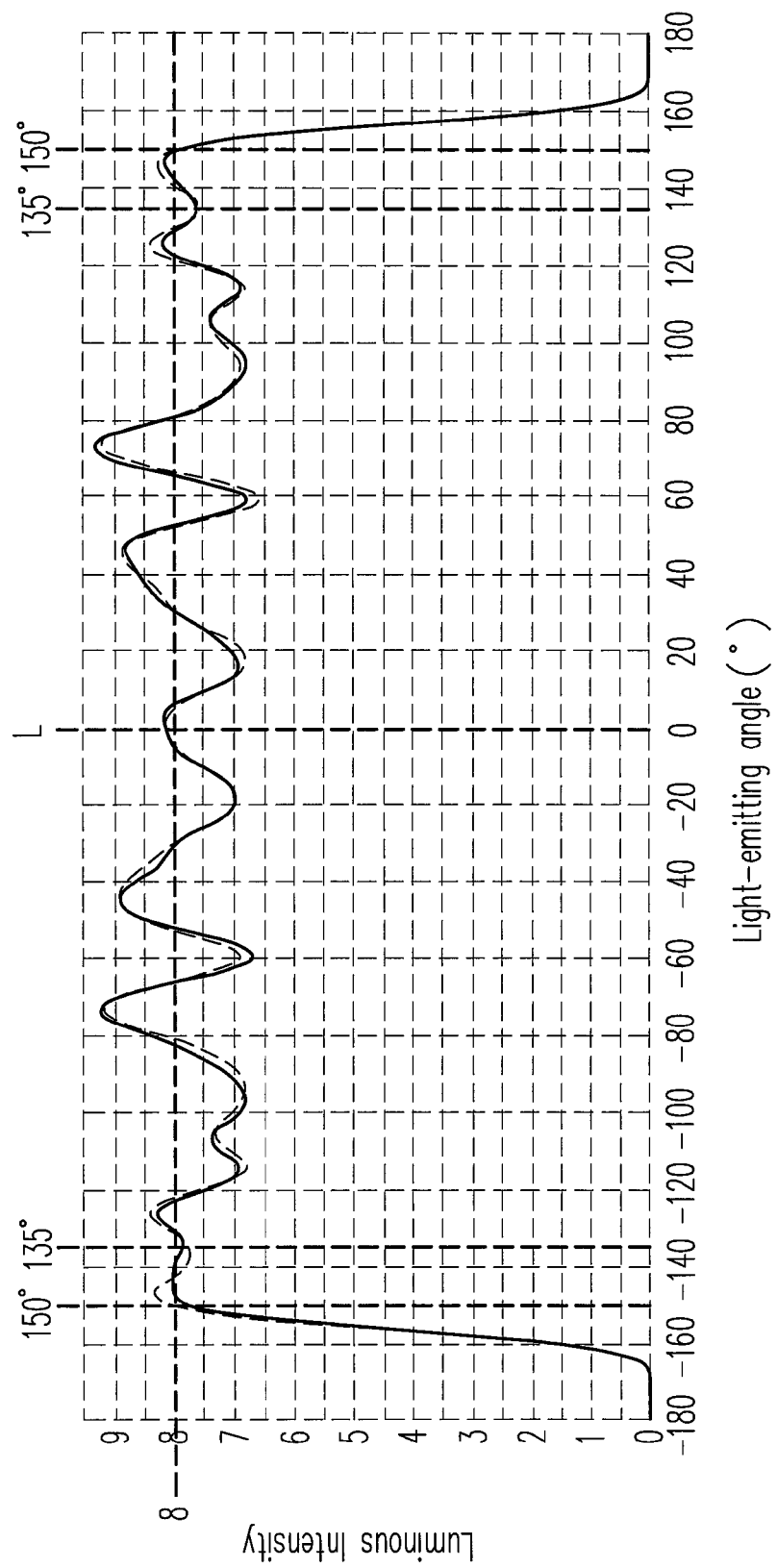

FIGS. 4 and 5 are diagrams illustrating the luminous intensity of the light source device illustrated in FIG. 2 with respect to the light emission angle, where the horizontal axis refers to the light emission angle and the vertical axis presents the luminous intensity. With reference to FIGS. 3 and 5, in the present embodiment, the optical lens 100 of the light source device 10 improves the light output effect through the design described above. For example, the first angle α1 is 37 degree, the second angle α2 is 21.33 degree, the third angle α3 is 31.57 degree, and the distance between the second intersection S2 and the third intersection S3 is approximately half of the length of the second line L2 that is the length between the second intersection S2 and the reference point O. Diagrams of the luminous intensity (unit: Candela, cd) with respect to the light emission angle (unit: degree) as illustrated in FIGS. 4 and 5 show a result of a luminous intensity distribution simulation performed on the light source device 10. In FIG. 4, a center point of the diagram may be regarded as the reference point O, and an axial line having a light emission angle of 0 degree may be regarded as the optical axis L. It may be obtained from FIG. 4 that the light emission angle of the light source device 10 exceeds 300 degree. In other words, the light emission angles of two opposing sides of the optical axis L of the light source device 10 respectively exceed 150 degree. Accordingly, the light source device 10 has a wider light emission angle. Furthermore, according to Energy Star's omnidirectional specification, luminous intensity (cd) at any angle in the 0° to 135° zone shall not differ from the mean intensity for the entire 0° to 135° zone by more than 20%. As shown in FIG. 5, the luminous intensity at the light emission angle within 0 to 135 degree is varied between 6.5 and 9.5, and the mean intensity is approximately 8. Therefore, the luminous intensity of the light source device 10 at the light emission angle within 0 to 135 degree differ from the mean intensity by approximately 18.75%, which meets the requirement specified in Energy Star's omnidirectional specification. Accordingly, the light source device 10 has great light output effect and is omnidirectional.

Figure 6:
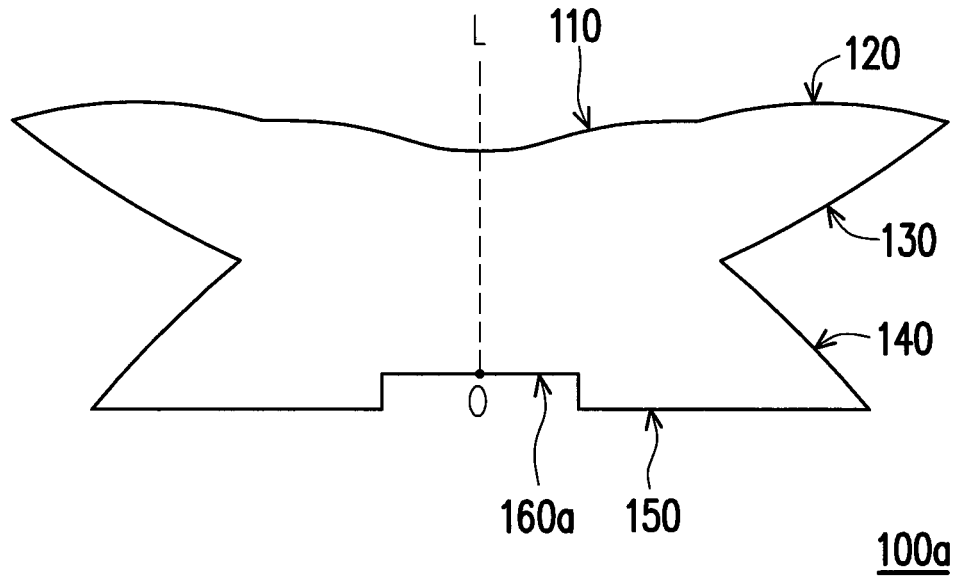
FIG. 6 is a diagram illustrating a cross sectional view of an optical lens according to another exemplary embodiment of the disclosure.

FIG. 6 is a diagram illustrating a cross sectional view of the optical lens according to another exemplary embodiment of the disclosure. With reference to FIG. 6, in the present embodiment, the main difference between an optical lens 100a and the optical lens 100 is that a light-incident surface 160a of the optical lens 100a is a flat or non-curved surface and axisymmetrical with respect to the optical axis L. Furthermore, the light-incident surface 160a of the optical lens 100a forms a cylindrical pocket. Therefore, the disclosure is not intended to limit the shape of the light-incident surface of the optical lens, that is, the light-incident surface of the optical lens can be a surface of pocket having a spherical, a cylindrical or an aspherical structure according to the design requirement. Through the optical surface design forming a pocket with an aspherical surface, the light-incident surface 160a may distribute the light beam of the light source 12, so that the light emission intensity of the light beam is uniformly distributed to the first light exit surface 110, the TIR surface 120, the third light exit surface 140. Accordingly, the light output effect of the light source device 10 can have even brightness.

Figure 7:
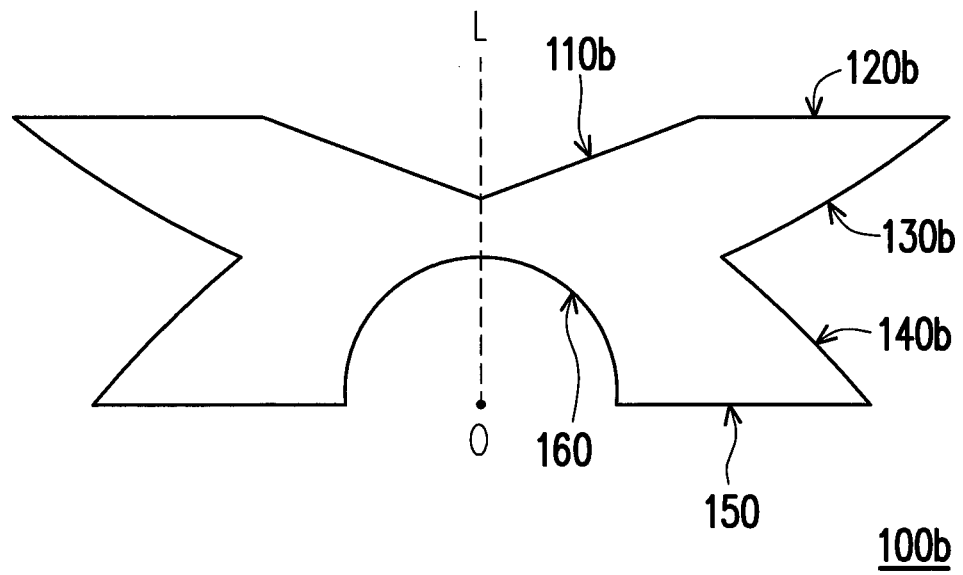
FIG. 7 is a diagram illustrating a cross sectional view of an optical lens according to yet another exemplary embodiment of the disclosure.

FIG. 7 is a diagram illustrating a cross sectional view of the optical lens according to yet another exemplary embodiment of the disclosure. With reference to reference FIG. 7, in the present embodiment, the main difference between the optical lens 100b and the optical lens 100 is that a first light exit surface 100b, a TIR surface 120b, a second light exit surface 130b and a third light exit surface 140b are all flat or non-curved surfaces. Accordingly, the disclosure is not intended to limit the shape of the first light exit surface, the TIR surface, the second light exit surface and the third light exit surface, which may be a flat surface, curved surface or a contour formed by flat surfaces having different slopes according to the requirement.

In summary, the optical lens of the disclosure has a plurality of light exit surfaces and a TIR surface to guide the light beam of the light source. By defining a reference point on an optical axis, a first direction of the reference point pointing toward an arbitrary point on the TIR surface intersects with the normal of the TIR surface at the arbitrary point and forms a reflecting angle that is greater than a critical angle of TIR. The reference point is utilized to simulate an emitting point of the light source. After the light beam emitted by the light source enters the optical lens, the light beam emits outward through a plurality of light exit surfaces, in which a part of the light beam reflected by the TIR surface leaving the optical lens with a light emission angle greater than 180 degree, which is defined by 90 degree of the two opposite sides of the optical axis. Therefore, the light emission angle, the luminous intensity and the uniformity of the light emission distribution of the light source device are improved. Accordingly, the optical lens of the disclosure may be applied to the light source device to guide the light beam of the light source device, and the light source device may provide wider range of the light emission angle as well as great light output effect.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An optical lens, having an optical axis, comprising:
   a first light exit surface, wherein the optical axis passes through the first light exit surface;
   a total internal reflection (TIR) surface, connected to the first light exit surface at a first intersection between the first light exit surface and the TIR surface, wherein a first line passing through the first intersection and a reference point defined on the optical axis intersects with the optical axis to form a first angle between 30 degrees to 60 degrees, wherein a first direction of the reference point pointing toward a point on the TIR surface intersects with a normal of the TIR surface at the point to form a reflecting angle larger than a critical angle of TIR;
   a second light exit surface, located opposite to the TIR surface, and connected to the TIR surface at a second intersection between the second light exit surface and the TIR surface, wherein a second line passing through the second intersection and the reference point intersects with the first line to form a second angle between 10 degrees to 30 degrees;
   a third light exit surface, connected to the second light exit surface at a third intersection between the second light exit surface and the third light exit surface, wherein the second light exit surface and the third light exit surface is located between the optical axis and a plane through the second intersection parallel to the optical axis; and
   a light-incident surface, located on an opposite side of the first light exit surface, wherein the optical axis passes through the light-incident surface.

2. The optical lens as claimed in claim 1, wherein a second direction of the reference point pointing toward a point on the first light exit surface intersects with a normal of the first light exit surface at the point to form a reflecting angle smaller than the critical angle of TIR.

3. The optical lens as claimed in claim 1, wherein a third direction of the reference point pointing toward a point on the third light exit surface intersects with a normal of the third light exit surface at the point to form a reflecting angle smaller than the critical angle of TIR.

4. The optical lens as claimed in claim 1, wherein the third intersection is located on the second line, and a distance between the second intersection and the third intersection is within one-third to two-thirds of a length between the second intersection and the reference point.

5. The optical lens as claimed in claim 1, further comprising a reference base, located on an opposite side of the first light exit surface, wherein the reference base is respectively connected to the light-incident surface and the third light exit surface, a third line passing through the reference point and a fourth intersection of the third light exit surface and the reference base intersects with the second line to form a third angle between 20 degrees and 40 degrees.

6. The optical lens as claimed in claim 1, wherein the light-incident surface forms a pocket.

7. The optical lens as claimed in claim 1, wherein the first light exit surface is a flat surface, a curved surface or a contour formed by a plurality of flat surfaces having different slopes.

8. The optical lens as claimed in claim 1, wherein the TIR surface is a flat surface, a curved surface or a contour formed by a plurality of flat surfaces having different slopes.

9. The optical lens as claimed in claim 1, wherein the second light exit surface is a flat surface, a curved surface or a contour formed by a plurality of flat surfaces having different slopes.

10. The optical lens as claimed in claim 1, wherein the third light exit surface is a flat surface, a curved surface or a contour formed by a plurality flat surfaces having different slopes.

11. A light source device, comprising:
   an optical lens, having an optical axis, comprising:
      a first light exit surface, wherein the optical axis passes through the first light exit surface;
      a total internal reflection (TIR) surface, connected to the first light exit surface at a first intersection between the first light exit surface and the TIR surface, wherein a first line passing through the first intersection and a reference point defined on the optical axis intersects with the optical axis to form a first angle between 30 degrees to 60 degrees, wherein a first direction of the reference point pointing toward a point on the TIR surface intersects with a normal of the TIR surface at the point to form a first reflecting angle larger than a critical angle of TIR;
      a second light exit surface, located opposite to the TIR surface, and connected to the TIR surface at a second intersection between the second light exit surface and the TIR surface, wherein a second line passing through the second intersection and the reference point intersects with the first line to form a second angle between 10 degrees to 30 degrees;
      a third light exit surface, connected to the second light exit surface at third intersection between the second light exit surface and the third light exit surface, wherein the second light exit surface and the third light exit surface is located between the optical axis and a plane through the second intersection parallel to the optical axis; and
      a light-incident surface, located on an opposite side of the first light exit surface, wherein the optical axis passes through the light-incident surface; and
   a light source, having a light emitting surface and providing a light beam, wherein the reference point is located at the light emitting surface, a part of the light beam entering the optical lens through the light-incident surface is reflected by the TIR surface, and then leaves the optical lens through the second light exit surface of the optical lens.

12. The light source device as claimed in claim 11, wherein a second direction of the reference point pointing toward a point on the first light exit surface intersects with a normal of the first light exit surface at the point to form a reflecting angle smaller than the critical angle of TIR.

13. The light source device as claimed in claim 11, wherein a third direction of the reference point pointing toward a point on the third light exit surface intersects with a normal of the third light exit surface at the point to form a reflecting angle smaller than the critical angle of TIR.

14. The light source device as claimed in claim 11, wherein the third intersection is located on the second line, and a distance between the second intersection and the third intersection is within one-third to two-thirds of a length between the second intersection and the reference point.

15. The light source device as claimed in claim 11, wherein the optical lens further comprises a reference base, located on an opposite side of the first light exit surface, wherein the reference base is respectively connected to the light-incident surface and the third light exit surface, a third line passing through the reference point and a fourth intersection of the third light exit surface and the reference base intersects with the second line to form a third angle between 20 degrees and 40 degrees.

16. The light source device as claimed in claim 11, wherein the light-incident surface forms a pocket.

17. The light source device as claimed in claim 11, wherein the first light exit surface is a flat surface, a curved surface or a contour formed by a plurality of flat surfaces having different slopes.

18. The light source device as claimed in claim 11, wherein the TIR surface is a flat surface, a curved surface or a contour formed by a plurality of flat surfaces having different slopes.

19. The light source device as claimed in claim 11, wherein the second light exit surface is a flat surface, a curved surface or a contour formed by a plurality of flat surfaces having different slopes.

20. The light source device as claimed in claim 11, wherein the third light exit surface is a flat surface, a curved surface or a contour formed by a plurality flat surfaces having different slopes.

21. The light source device as claimed in claim 11, wherein the optical axis overlaps with a normal of the light emitting surface of the light source.

* * * * *